M. F. FULFORD.
POWER TRANSMITTING MECHANISM FOR PUMPS.
APPLICATION FILED DEC. 1, 1913.
1,156,002.
Patented Oct. 5, 1915.
2 SHEETS—SHEET 1.
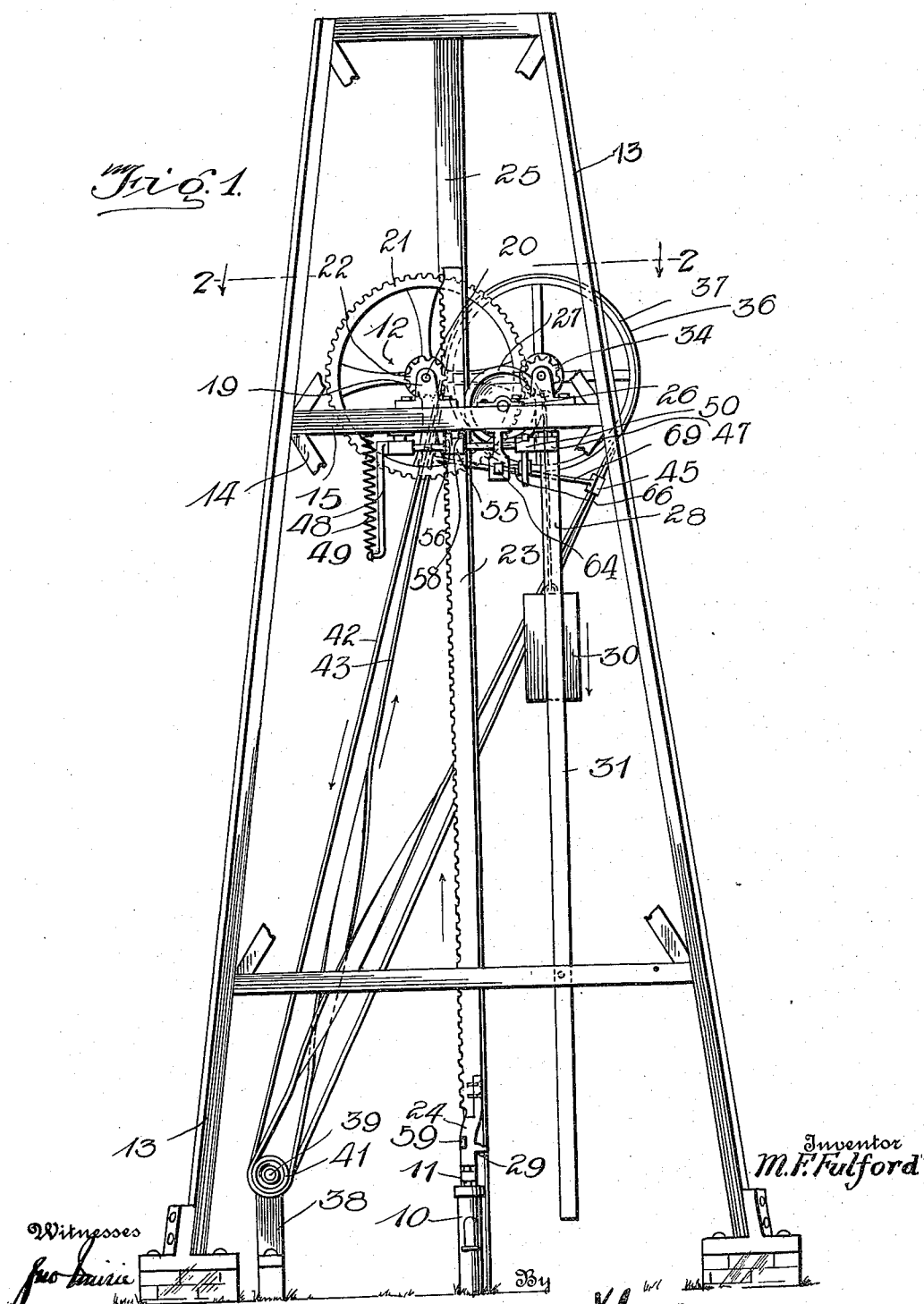

M. F. FULFORD.
POWER TRANSMITTING MECHANISM FOR PUMPS.
APPLICATION FILED DEC. 1, 1913.
1,156,002.
Patented Oct. 5, 1915.
2 SHEETS—SHEET 2.
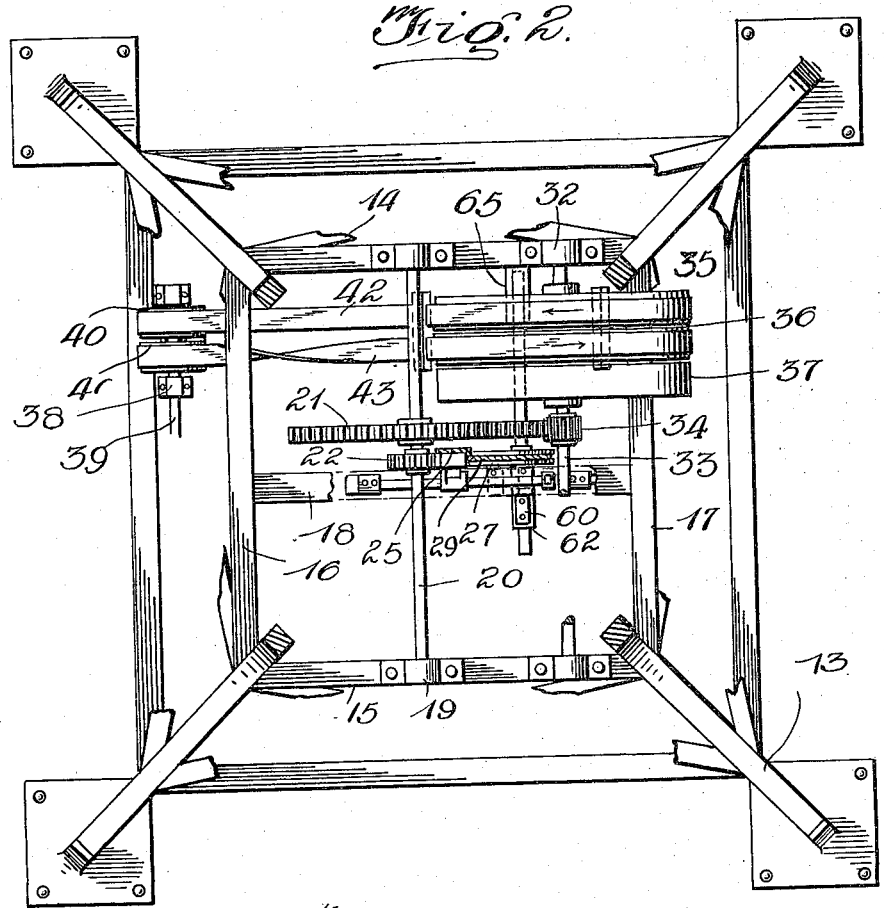
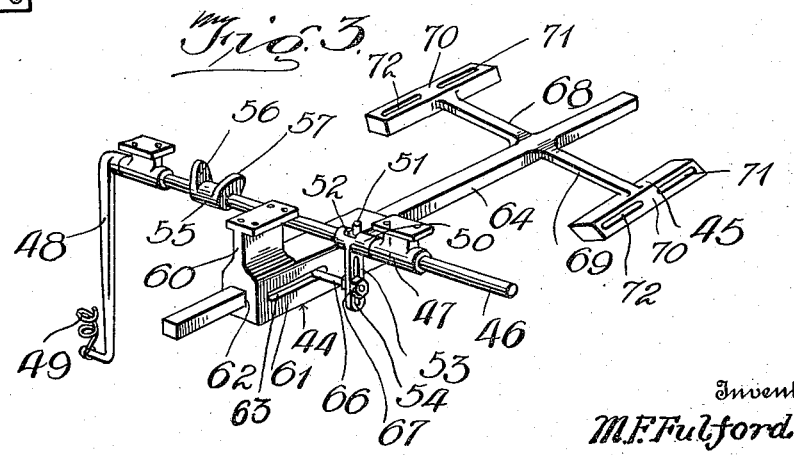
Inventor
M. F. Fulford.
Witnesses
By
Attorneys

UNITED STATES PATENT OFFICE.

MARCUS F. FULFORD, OF FORT WORTH, TEXAS.

POWER-TRANSMITTING MECHANISM FOR PUMPS.

1,156,002. Specification of Letters Patent. Patented Oct. 5, 1915.

Application filed December 1, 1913. Serial No. 804,089.

*To all whom it may concern:*

Be it known that I, MARCUS F. FULFORD, citizen of the United States, residing at Fort Worth, in the county of Tarrant and State of Texas, have invented certain new and useful Improvements in Power-Transmitting Mechanism for Pumps, of which the following is a specification.

My invention relates to improvements in pump operating mechanisms, the primary object of my invention being the provision of a mechanism for operating long stroke, double-acting pumps with a minimum expenditure of power.

With this object in view I provide an elongated rack bar, the teeth of which engage with a driven gear and one end of which is operatively connected to the pump rod or plunger, the gear with which the rack bar meshes being intermittently driven first in one direction and then in another through the medium of pulley belts and pulleys.

A further object of my invention is the provision of a counterweight for balancing the weight of the rack bar, pump rod and the water column from the pump to the surface of the ground.

A further object of my invention is to provide an improved form of belt shifter adapted to be automatically operated by the reciprocation of the rack bar to simultaneously shift two driving belts acting upon a series of pulleys upon a common shaft to reverse the direction of rotation of the shaft, the shifting device being arranged to shift one belt from a fixed pulley to an idler pulley and the other belt from an idler pulley to the fixed pulley or vice versa, to reverse the movement of the rack bar.

In this connection, a still further object of my invention is to so construct the belt shifting mechanism that the shifting of the belts will be practically instantaneous, thereby avoiding any possibility of having two oppositely driven belts acting upon the same fixed pulley at the same time.

With these and other objects in view, my invention will be more fully described, illustrated in the accompanying drawings, and then specifically pointed out in the claims which are attached to and form a part of this application.

In the drawings:—Figure 1 is a side elevation of my improved pump operating structure, parts of the tower braces being broken away to more clearly show the mechanism proper; Fig. 2 is a transverse sectional view on the line 2—2 of Fig. 1, showing the pump operating mechanism in top plan view; Fig. 3 is a detail perspective view of the reversing mechanism including the belt shifting device.

Corresponding and like parts are referred to in the following description and indicated in all the views of the drawings by the same reference characters.

My improved pump operating mechanism may be employed in connection with any form of pump of the reciprocatory plunger type and the supporting structure for said mechanism may be varied in construction, proportions and size, to suit various conditions and necessities.

For the sake of clearness I have illustrated the mechanism in connection with a conventional pump 10 of the double-acting type having a pump rod or plunger 11.

My pump operating mechanism is intended for use with pumps having an exceptionally long stroke, that is, pumps having a stroke from ten to thirty feet or more and it will therefore be apparent that the pump 10 is of this type, although the construction of the pump itself is not illustrated.

The pump operating mechanism, indicated as a whole by the numeral 12 is supported adjacent the upper end of a suitable tower 13. This tower may be formed from metal or wood, the former being preferred, its specific construction being immaterial, as regards this application. The tower supports a pair of parallel, spaced apart, horizontally disposed timbers or beams, of wood or iron, 14 and 15 and a similar pair of beams 16 and 17, the beams 16 and 17 being connected intermediate their length by a beam 18. These beams form the supporting structure proper for the pump operating mechanism 12.

The beams 14 and 15 are provided with alined bearings 19 in which are journaled the ends of a shaft 20 upon which is keyed a large spur gear 21 and a relatively small spur gear 22. An elongated rack bar 23 is secured by one end to a casting 24, the construction of which will be later explained and which serves to connect the rack bar to the pump rod 11, and this rack bar is supported by a guide or guides 25 in such a manner that its teeth mesh with the teeth of the smaller gear 22 of the shaft 20. The rack bar 23 is somewhat longer than the length of the pump stroke and the supporting frame for the pump operating mechanism is so disposed upon the tower that the teeth at the upper end of the rack bar will mesh with the gear 22 when the pump rod is in its lowermost position. A bracket 26, carried by the middle portion of the beam 18, supports a pulley 27 over which is trained a cable 28. One end of this cable is connected to a laterally directed eye forming lug 29 extending from the casting 24 and the other end of the cable is connected to a counterweight 30 slidable between spaced vertical guides 31. As shown in Fig. 1 the pulley 27 is so disposed that its inner periphery is just out of alinement with the rack bar 23 for which reason, the strain exerted upon the rack bar and pump rod through the weight 30 is exerted directly in alinement with the pump rod and rack bar. This counterweight 30 should exactly balance the weight of the rack bar, the pump rod and the column of water between the water level in the well and the point of discharge of the pump. This being the case, it will be apparent that only such power will be necessary to operate the pump as will be required to draw the water into the pump cylinder.

The beams 14 and 18 are provided with alined bearings 32 providing journals for a shaft 33 which extends in parallel spaced relation to the shaft 20. A relatively small spur gear 34 keyed upon this shaft meshes with the large gear 21 of the shaft 20, whereby rotation of the shaft 33 will cause rotation of the shaft 20. A plurality of large pulley wheels 35, 36 and 37 are mounted upon the shaft 33 in close relation to each other, the pulleys 35 and 37 being idly mounted upon the shaft, while the pulley 36 is fixed to rotate with the shaft.

Bearings 38, in alinement with each other, are supported at any suitable or convenient point, preferably near the ground, and journal a shaft 39 which may be the shaft of an electric or internal combustion motor or a shaft driven from any suitable source of power and fixed upon this shaft are relatively small pulley wheels 40 and 41. Belts 42 and 43 are trained about the pulleys 40 and 41, respectively and about two of the pulleys 35, 36 and 37, the belt 42 being shiftable from the pulley 35 to the pulley 36 or the reverse, while the belt 43 is shiftable from the pulley 37 to the pulley 36 or the reverse. As shown, one of these belts is crossed whereby the shaft 33 will be driven in one direction or the other according to which of the two belts engages the pulley wheel 36.

In order to provide a reversing mechanism for the shaft 20 to reverse the movement of the rack bar 23 when the latter has reached its highest or lowest position, I provide an automatic reversing mechanism, indicated as a whole by the numeral 44, this mechanism including a double belt shifting device 45.

The reversing mechanism proper includes a shaft 46 journaled in alined bearings 47 depending from the beam 18. This shaft is provided at one end with a downwardly directed crank arm 48, to the free end of which is attached one end of a helical spring 49, the other end of the spring being attached to the beam 18. A sleeve 50 is mounted upon the shaft 46, being held against longitudinal movement thereon by a pin 51 which is passed through a slot 52 in the sleeve and threaded or otherwise secured in the shaft 46. The slot 52 is so formed as to permit a slight turning movement of the sleeve 50 independent of the shaft 46. The above described sleeve carries a radially extending arm 53 having a longitudinal slot 54, this arm forming the shifting lever by means of which the belt shifting device 45 is actuated. A second sleeve 55 is keyed or otherwise secured against movement upon the shaft 46 and is provided at its ends with radially directed cam lugs 56 and 57 angularly disposed with respect to each other.

The rack bar 23 is provided adjacent its upper end with a laterally directed trip lug 58 adapted to engage with the cam lug 57 to swing the shaft 46 when the rack bar has reached its lowest position, while the casting 24 is provided with a similar trip lug 59 adapted to engage the cam lug 56 to oppositely rotate the shaft 46 when the rack bar has reached its highest position.

A bracket 60 is secured to the lower face of the beam 18 and terminates in a transversely extending sleeve 61 having a squared bore 62 and a slot 63 formed in the side of the sleeve and communicating with the bore. A squared shaft 64 is reciprocally mounted in this sleeve and in a sleeve 65 secured to the under face of the beam 14 and in alinement with the sleeve 61. The amount of reciprocation of this squared shaft 64 is limited by a pin 66 which extends from the shaft through the slot 63 of the sleeve and through the slot 54 of the shifting lever 53. If desired, the shifting lever may bear between nuts 67 threaded upon this pin in order to avoid any possibility of disengagement of the shifting lever from the pin.

The squared shaft 64 is provided with a pair of oppositely extending T-shaped arms 68 and 69, the heads 70 of which are provided with belt receiving eyes or loops 71 and 72. The belt 42 passes through the belt receiving loops 71, while the belt 43 passes through the belt receiving loops 72 of these arms.

From the foregoing description, taken in connection with the drawings, the operation of my pump mechanism will be readily understood and but slight description of the same is necessary. The drive belts 42 and 43 are constantly driven, in opposite directions, by the rotation of the shaft 39 and its pulley wheels and one or the other of these belts is in engagement with the fixed pulley 36 to drive the shaft 33 and so rotate the shaft 20 to raise or lower the rack bar 23.

For the sake of clearness I will assume that the rack bar has just reached the bottom of its stroke and that the belts and gears are moving in the directions indicated by the arrows to raise the rack bar. When the rack bar reaches the limit of its upward stroke, the lug 59 engages the cam lug 56 to swing the arm 46. The engagement of the lug 59 and cam 56 is sufficient to swing the shaft 46 until the crank arm 49 is past dead center, the slot 52 being of such length as to permit this swinging without movement of the sliding shaft 64. As soon as the crank shaft 48 passes dead center, the spring 49 draws it to the limit of its movement further turning the shaft 46 and acting through the lever 53 and pin 66 to draw the sliding shaft 64 and belt shifting arms away from the beam 18. This movement of the sliding shaft simultaneously shifts the belt 42 from the fixed pulley 36 to the idler pulley 35 and the belt 43 from the idler pulley 37 to the fixed pulley 36, thereby reversing the direction of rotation of the shaft 33 and consequently the direction of movement of the rack bar 23. In like manner, when the rack bar reaches the limit of its downward stroke its lug 58 engages the cam lug 57 to throw the shaft 46 in the reverse direction and shift the belts back to the position shown in Fig. 2.

It will therefore be seen that I have provided means for constantly reciprocating the rack bar 23 through power derived from a shaft constantly driven in one direction. By providing the shaft 46 with the crank arm 48 and spring 49, and by connecting this shaft with the belt shifting mechanism, through the medium of the slotted sleeve 50 and pin 51, it will be seen that I provide means for shifting the belts with great rapidity, thereby avoiding any likelihood of both belts engaging the fixed pulley at the same time, the belt shifting shaft 64 not moving until the crank arm 48 is past dead center and then moving rapidly through the action of the spring 49.

It will of course be understood that I do not wish in any way to limit myself to the specific details of construction, illustrated and described, as various minor changes, within the scope of the appended claims, such as the insertion of additional gears between the shaft 33 and shaft 20, or variations in the length of rack bar, manner of counterbalancing the same and the like, may be made without in the slightest degree departing from the spirit of my invention.

Having thus described the invention, what is claimed as new is:

1. The combination with a reciprocable pump plunger, of a reciprocating member connected to the plunger, driving means including a rotatable shaft, means for transmitting movement from the shaft to the reciprocating member, and means operable by movement of the reciprocating member for reversing the driving means to reverse the direction of movement of the shaft.

2. A pump actuating mechanism including a member, a shaft, a fixed pulley mounted on the shaft, idler pulleys mounted upon the shaft upon either side of the fixed pulley, means operable by rotation of the fixed pulley to the reciprocating member, a pair of oppositely moving belts trained over adjacent pulleys, and means for shifting said belts, said means including a second shaft, a crank arm on the shaft, a spring operatively connected to the arm to hold the same off dead center, a cam lug extending from the second shaft and engageable by the reciprocating member to swing the shaft past dead center, a reciprocally mounted rod having belt engaging arms, a pin extending from the reciprocally mounted rod, a sleeve upon the rotatable shaft, a slotted lever carried by the sleeve and engaging the pin, said sleeve being provided with a slot, and a pin carried by the second shaft and extending through the slot of the sleeve.

3. A pump actuating mechanism including a reciprocating member, a shaft, a fixed pulley mounted on the shaft, idler pulleys mounted upon the shaft upon either side of the fixed pulley, means operable by rotation of the fixed pulley to actuate the reciprocating member, a pair of oppositely moving belts trained over adjacent pulleys, and means for shifting said belts, said means including a reciprocating rod operatively engaging the belts, a crank arm operatively connected to the rod, a second crank arm adapted to be swung by movement of the reciprocating member, a connection between the crank arms, whereby the movement of the second crank arm beyond a certain point will cause corresponding movement of the first crank arm, and means for holding the second crank arm off dead center.

In testimony whereof I affix my signature in presence of two witnesses.

MARCUS F. FULFORD. [L. S.]

Witnesses:
R. J. PENCE,
E. A. JACKSON.

Copies of this patent may be obtained for five cents each, by addressing the "Commissioner of Patents, Washington, D. C."